PATENTED OCT 5 1971

3,611,173

INVENTORS
FREDERICK S. GOULDING
WILLIAM L. HANSEN
JOHN T. WALTON
BY
ATTORNEY

United States Patent

[11] 3,611,173

[72] Inventors Frederick S. Goulding
Lafayette;
William L. Hansen, Walnut Creek; John T. Walton, Orinda, all of Calif.
[21] Appl. No. 873,221
[22] Filed Nov. 3, 1969
[45] Patented Oct. 5, 1971
[73] Assignee The United States of America as represented by the United States Atomic Energy Commission

[54] CHARGE-SENSITIVE PREAMPLIFIER USING OPTOELECTRONIC FEEDBACK
6 Claims, 2 Drawing Figs.
[52] U.S. Cl. .................................................. 330/59,
330/3, 330/26, 330/35
[51] Int. Cl. ........................................................ H03f 17/00
[50] Field of Search.......................................... 330/59,
149, 3; 250/217

[56] References Cited
UNITED STATES PATENTS
| | | | |
|---|---|---|---|
| 3,213,391 | 10/1965 | Kovalerski et al. ........... | 333/14 |
| 3,225,304 | 12/1965 | Richards ....................... | 330/59 X |
| 3,248,642 | 4/1966 | Rothschild ................... | 323/21 |
| 3,278,672 | 10/1966 | Grodinsky et al............. | 330/59 X |

OTHER REFERENCES
Nuclear Instruments and Methods 37, 1965, pp. 327– 329 " Preamplifier with 0.7 Kev Resolution for Semiconductor Radiation Detectors" by E. Elad. 330–35

*Primary Examiner*—Nathan Kaufman
*Attorney*—Roland A. Anderson

ABSTRACT: A low-noise integrating preamplifier particularly useful for the processing of signals in semiconductor detector nuclear radiation spectrometers to provide a significant improvement in the energy resolution thereof. Noise reduction and increased resolution are achieved by employment of optoelectronic feedback to simulate a pure resistance in place of the component resistor conventionally employed as the DC feedback element of a conventional preamplifier.

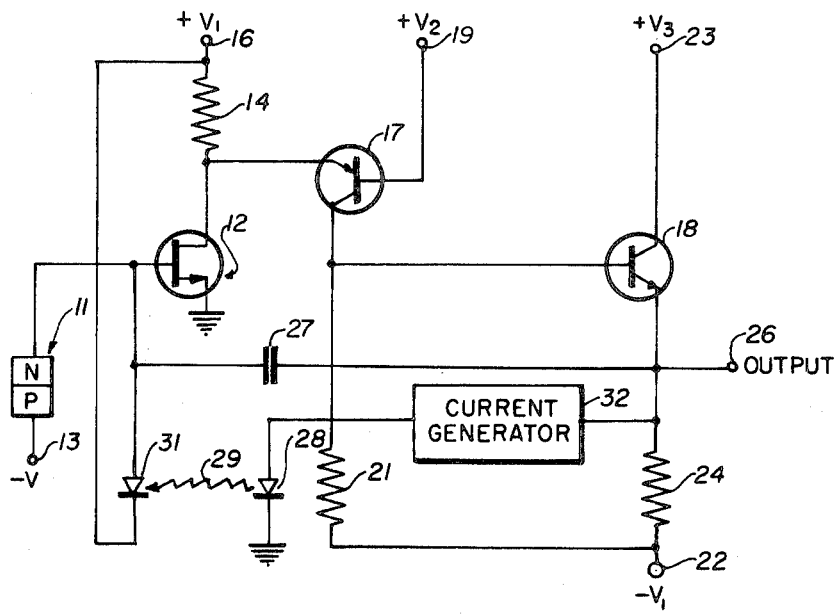

CHARGE-SENSITIVE PREAMPLIFIER USING OPTOELECTRONIC FEEDBACK

BACKGROUND OF THE INVENTION

The invention described herein was made in the course of, or under, Contract W-7405-ENG-48, with the Atomic Energy Commission.

Considerable effort has been expended in recent years on the development of high-resolution nuclear spectroscopy systems. With the advent of solid-state radiation detectors, it became possible to design spectrometers having significantly increased energy resolution of the detected nuclear radiation. In particular very high signal-to-noise ratio semiconductor diodes used for radiation detection have been developed to the extent their resolution capabilities closely approach the ultimate statistically possible limit. Consequently, the major limitation on the resolution of a semiconductor detector nuclear spectrometer system is imposed by the electronic output circuitry associated with the detector for processing the detected radiation signals therefrom. More particularly, a charge-sensitive preamplifier generally receives the radiation-induced very fast current pulses from the detector and integrates them to determine the charge, the resulting signal being applied by subsequent amplification stages to appropriate analyzer equipment. Electronic noise in the input circuit of the preamplifier thus represents a primary factor in the degradation of the resolution of the spectrometer system. As a result it has been the usual practice to employ a high-gain low-noise operational amplifier with a parallel resistor-capacitor combination in the feedback path, as the charge-sensitive preamplifier. A field-effect transistor (FET), usually cooled to a low temperature approaching that of liquid nitrogen, is commonly used as the first amplifying element of the preamplifier due to the excellent low-noise performance thereof. Despite the significant improvement in resolution attributable to a low-noise input FET, other factors contribute to the noise behavior of the conventional charge-sensitive preamplifier and thereby limit the overall resolution of the spectrometer system. In this regard, the achievement of ultimate resolution dictates minimized input capacity to the preamplifier and thus the use of a low-valued feedback capacitor in the integrating feedback loop. A high-valued component resistor is therefore commonly employed as the DC feedback element of the loop in order to provide a suitable integrating time constant in conjunction with the low-valued feedback capacitor. Such a component resistor injects inherent thermal noise as well as extraneous noise of an unexplained nature into the preamplifier circuit. The thermal noise contribution may be reduced by operating the resistor at low temperature, such as the reduced temperature of the FET employed to minimize the noise contribution of this component. Unfortunately, presently available component resistors may change value radically at low temperatures, and in some cases the changes are permanent. A further factor which must be considered in the conventional use of a high-valued component resistor as the DC feedback element of the preamplifier is that such a resistor does not behave as a pure resistance in the frequency range of interest of the spectrometer system. More particularly, at frequencies in the optimum signal-to-noise ratio frequency band of filter networks contained in the amplification circuitry following the preamplifier, the feedback component resistor exhibits significant changes in both the resistive and reactive components of its impedance with respect to frequency. The resistive changes are such as to increase the noise contribution to the preamplifier over that which would normally be anticipated at lower frequencies. The changes in both the resistive and reactive components cause the decay of charge in the feedback loop to depart from a pure single time-constant exponential. This poses problems at high counting rates in the spectrometer system, since pole-zero cancellation methods of correcting for the response of the preamplifier are then inadequate. Finally, by its very presence, the feedback resistor increases stray capacity to ground on the input of the preamplifier FET, thereby degrading the energy resolution performance of the spectrometer system.

By virtue of the limitations and disadvantages imposed by the use of a high-valued component resistor as the DC feedback element of a conventional charge-sensitive preamplifier for nuclear spectroscopy, various attempts have been made to avoid the resistor altogether. This has been accomplished, for example, by using the open circuit gate approach disclosed in the article by E. Elad, "Preamplifier with 0.7 keV Resolution for Semiconductor Radiation Detectors," Nuclear Instruments and Methods, Vol. 37, (1965) pages 327-329. However, such a nonfeedback approach suffers from concomitant reduced gain stability disadvantages.

SUMMARY OF THE INVENTION

The present invention relates to an improved low-noise charge-sensitive integrating preamplifier which is particularly applicable to semiconductor nuclear radiation detector spectrometers to materially increase the energy resolution thereof, and is more particularly directed to such a preamplifier in which the noise and resolution performance is improved and a single time-constant response obtained without loss of gain stability by means of optoelectronic feedback simulating a purely resistive DC feedback element.

A charge-sensitive preamplifier in accordance with the present invention generally comprises an operational amplifier having a low-noise input-amplifying element, preferably a FET, for receiving signals from a solid-state radiation detector, such as a reverse-biased lithium-drifted silicon diode detector. A feedback capacitor is coupled between the output of the amplifier and the input of the FET to facilitate integration of the detector signals. Optoelectronic feedback means in parallel with the capacitor simulate a purely resistive DC feedback element through which charge on the capacitor leaks to establish a desired exponential decay time constant in the output signal. The optoelectronic feedback means are preferably provided as a light-emissive element, such as a light-emitting diode, coupled to the amplifier output to emit light in proportion to the output signal thereat, and a light-sensitive element, such as a light-sensitive diode, in the input circuit of the FET to control the flow of current therein in proportion to the intensity of light received from the light-emissive element. The light feedback is therefore equivalent to a pure resistor from amplifier output to input.

As an important feature of the invention, the purely resistive nature of the optoelectronic feedback results in significantly reduced injection of noise to the preamplifier, and therefore improved energy resolution.

Another advantage arising from the purely resistive nature of the optoelectronic feedback resides in the provision of a single-valued decay time constant with respect to frequency, whereby accurate pole-zero cancellation can be accomplished in subsequent amplification stages of a spectrometer system.

Furthermore, the optoelectonic feedback is readily adaptable to integral incorporation of the light-sensitive element and feedback capacitor into the input FET, thereby eliminating extraneous components from the preamplifier input. As a result, the input capacity is minimized with an attendant further improvement in the noise and energy resolution performance of the preamplifier.

BRIEF DESCRIPTION OF THE DRAWING

The invention will be better understood upon consideration of the following description in conjunction with the accompanying drawing, wherein.

DETAILED DESCRIPTION OF THE INVENTION

Figure 1:
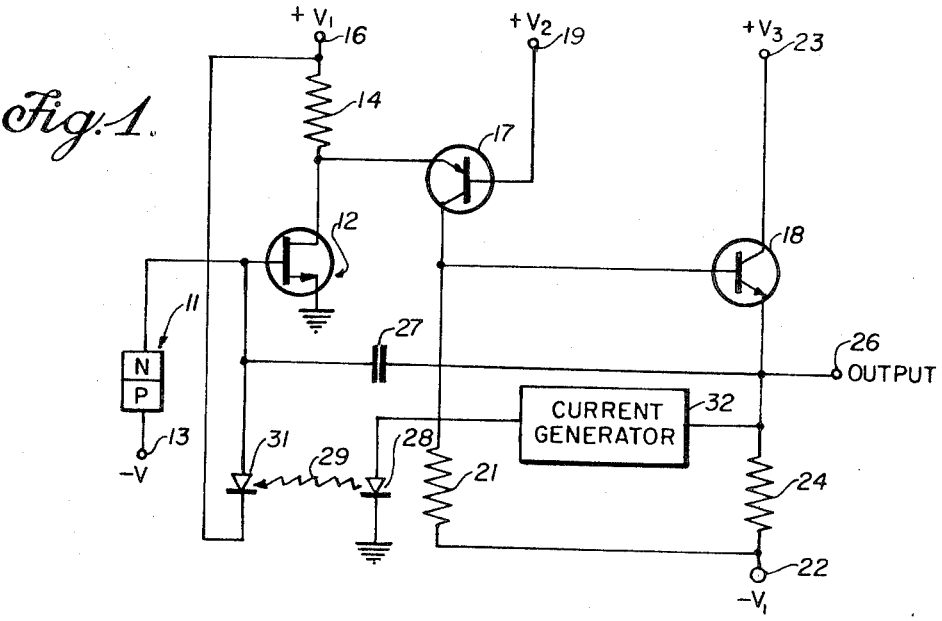
FIG. 1 is a schematic circuit diagram of an optoelectronic feedback preamplifier in accordance with the invention.

Referring now to FIG. 1, there will be seen to be provided a charge-sensitive preamplifier in accordance with the present invention which is particularly suited to integrating nuclear radiation-induced fast rise time pulses generated by a low-noise, high-resolution solid-state radiation detector, preferably a lithium-drifted silicon diode detector 11, such as is disclosed in U.S. Pat. No. 3,413,529 to Goulding et al. The preamplifier is designed for extremely low-noise, high-resolution performance so as to not degrade the capabilities of the detector, and in addition is arranged to provide a substantially single time-constant response in order that accurate pole-zero cancellation can be accomplished in subsequent amplification stages of a spectrometer system in which the preamplifier may be incorporated.

To the foregoing ends the preamplifier preferably includes a low-noise field-effect transistor (FET) 12 as the first amplifying element thereof in accordance with standard prior art practice. The diode 11 is connected to the gate terminal of the FET and the diode is reverse biased by connection to a bias terminal 13 maintained at a suitable potential -V. The source terminal of the FET is connected to ground while the drain terminal is coupled by means of a load resistor 14 to a positive bias terminal 16 maintained at a potential $+V_1$. The detector and FET are both preferably cooled to low temperature approaching that of liquid nitrogen in accordance with conventional practice in order to obtain further noise minimization.

The FET 12 is preferably followed by a conventional cascade amplifier output stage. More particularly, in the illustrated case a PNP transistor 17 connected in common-base configuration receives the output of the FET and applies same to an NPN transistor 18 connected as an emitter-follower. In this regard, the emitter of transistor 17 is connected to the drain terminal of FET 12, the base is connected to a positive bias terminal 19 maintained at a potential $+V_2$, and the collector is coupled by means of a load resistor 21 to a negative bias terminal 22 maintained at a potential $+V_1$. The collector of transistor 17 is connected to the base of transistor 18, the collector and emitter of which are respectively connected to a positive bias terminal 23 maintained at a potential $+V_3$, and coupled by means of a load resistor 24 to negative bias terminal 22. The emitter of transistor 18 is connected to an output terminal 26. With regard to the relative magnitudes of the bias potentials employed, it is to be noted that $V_1$ is substantially greater than $V_2$, and $V_3$ is intermediate $V_1$ and $V_2$.

In order to accomplish integration of the pulses generated by the radiation detector diode 11, the preamplifier is provided with an integrating feedback loop including a capacitance coupling the output of transistor 18, i.e., terminal 26, to the input of FET 12. In the present embodiment the feedback loop includes an integrating capacitor 27 connected from the emitter of transistor 18 to the gate terminal of FET 12. Hence to the extent thus far described, the preamplifier will be recognized as a substantially conventional operational amplifier having an integrating feedback loop including capacitor 27. However, the capacitor would be conventionally shunted with a high-valued component resistor serving as the DC feedback element of the loop. As previously noted, such a resistor is undesirable inasmuch as it variously detriments the noise and resolution performance of the preamplifier and does not behave as a pure resistance, thereby causing departures from a desired single-valued decay time-constant operation of the feedback loop.

In accordance with the particularly salient aspects of the present invention, the foregoing difficulties are obviated by replacement of the usual component resistor in the feedback loop of the preamplifier with optoelectronic feedback between the preamplifier output and gate input of the FET 12 to simulate a purely resistive DC feedback element in parallel with the capacitor 27. Such optoelectronic feedback is accomplished by means of a light-emitting diode 28, such as a gallium arsenide diode, or equivalent light-emissive element, coupled to the preamplifier output to generate light 29 having an intensity proportional to the output voltage thereat. The light 29 is received by a light-sensitive element, such as a reverse-biased silicon diode 31 in the input circuit of the preamplifier to control the flow of current therein in proportion to the intensity of the light 29. Since the light intensity is proportional to the output voltage, and the input current is proportional to the light intensity, the input current is proportional to the output voltage and therefore the optoelectronic feedback is equivalent to a pure resistor from amplifier output to input.

Considering now the optoelectronic feedback arrangement in greater detail, it is to be noted that the light-emitting diode 28 provides light intensities which are nearly linearly proportional to the diode current over a reasonable range of operating currents. Therefore, a current generator 32 is preferably connected to the emitter of output transistor 18 to provide a current which is linearly proportional to the output voltage. The output current from generator 32 is, in turn, driven through the light-emitting diode 28, such diode being serially connected between the generator output and ground. The intensity of the emitted light 29 is thereby substantially linearly proportional to the output voltage. In the present embodiment the light-sensitive diode 31 is provided as a separate component diode which is reverse biased and connected in the gate input circuit of FET 12 to control the current flow therethrough in linear proportion to the intensity of the emitted light 29 impinging same. More particularly, the positive terminal of diode 31 is connected to the gate terminal of FET 12, while the negative terminal of the diode is connected to positive bias terminal 16 so as to bias the diode in the reverse direction.

The intensity of the feedback light 29 is readily adjustable over a wide range by suitable positioning of the light-emitting diode 28 with reference to the light-sensitive diode 31, by the use of absorbers or light pipes in the light coupling path, and by other means to provide desired high values of simulated feedback resistance. The optoelectronic feedback of the present invention is compatible with the preferred low-temperature operation of the radiation detector 11 and FET 12, the efficiency of light generation of the light-emitting diode 28 being significantly increased at reduced temperatures. The light coupling is practically instantaneous and both diodes 28 and 31 have extremely rapid response times whereby the equivalent feedback resistance is substantially independent of frequency and thus purely resistive in the frequency range of interest of the preamplifier. A single-valued decay time constant is thereby provided in the integrating feedback loop, and moreover the noise contribution of the optoelectronic feedback is significantly minimized compared to that of a conventional component feedback resistor.

In accordance with the basic concept of the invention exemplified by the embodiment of FIG. 1 just described, it is possible to even further improve the noise and energy resolution performance of the preamplifier. In this regard, the feedback capacitor 27 and light-sensitive diode 31 both contribute to the stray capacity at the input circuit of the FET 12. In order to achieve the optimum in noise reduction and energy resolution, such stray capacity should be held to a minimum Consequently, advantages are to be gained by elimination of the extraneous components from the gate input circuit of FET 12. This is preferably accomplished by integrally incorporating the light-sensitive element and feedback capacitor into the FET in the manner depicted for the modified form of preamplifier illustrated in FIG. 2, thereby eliminating the component diode 31 and feedback capacitor 27 employed in the embodiment of FIG. 1. Otherwise the modified preamplifier of FIG. 2 will be seen to be generally similar to that of FIG. 1, and like numerals are employed to represent like components in the respective figures.

Figure 2:
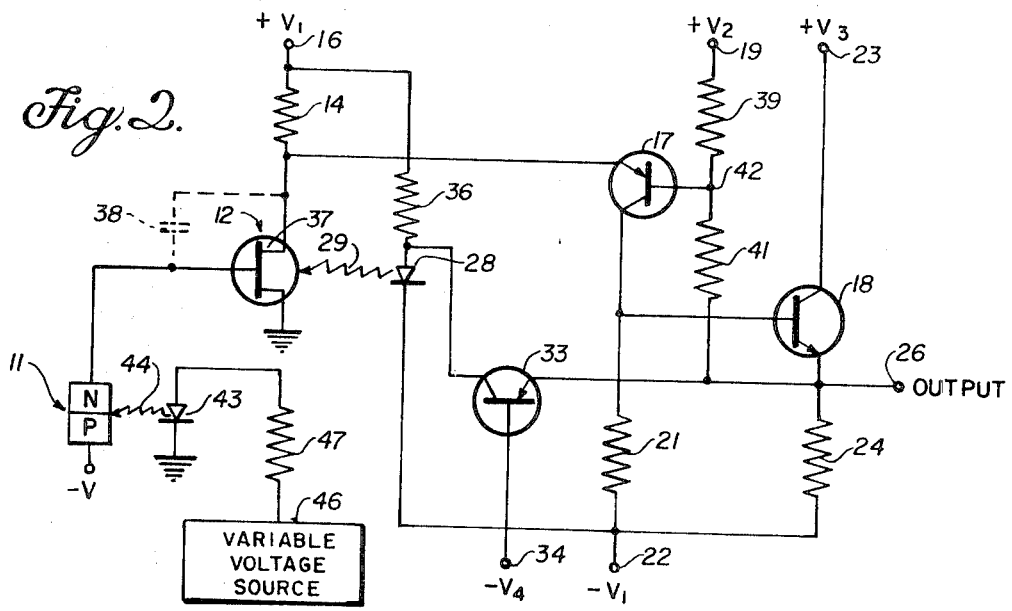
FIG. 2 is a schematic circuit diagram of a modified form of the inventive preamplifier.

In the preamplifier of FIG. 2, the radiation detector diode 11 is again connected to the gate terminal of FET 12 and the drain output thereof is applied to the common-base cascade transistor 17, in turn coupled to emitter-follower output transistor 18 to provide an output signal at terminal 26. The current generator 32 for driving the light-emitting diode 28 with current proportional to the output signal voltage in the present case is comprised of a PNP transistor 33 having its emitter connected to output terminal 26, base connected to a negative bias terminal 34 maintained at a potential $-V_4$, and collector coupled via a load resistor 36 to a positive bias source, such as terminal 16. The potential magnitude $V_4$ is less than $V_2$, and therefore considerably less than $V_1$. The light-emitting diode 18 is connected in the forward direction between the collector of the current generator transistor 33 and negative bias terminal 22 to thereby generate the light output 29 having an intensity substantially linearly proportional to the output voltage at terminal 26. To complete the optoelectronic feedback, in the present embodiment the light output 29 from diode 28 is directed upon the drain-gate junction diode 37 of the FET 12 which thereby integrally serves as the light-sensitive element in the gate input circuit of the FET. Moreover, the integrally contained drain-gate capacity 38 of the FET is employed as the integrating capacitor of the feedback loop in the embodiment of FIG. 2. More particularly, a pair of feedback resistors 39 and 41 are preferably serially connected between positive bias terminal 19 and output terminal 26, with the common junction 42 of the resistors connected to the base of transistor 17 to thereby feed a fraction of the output signal back via the resistors, transistor, and drain-gate capacity 38 to the input circuit of the preamplifier. Thus with the light-sensitive feedback element and feedback capacitance so integrated into the FET 12, the stray input capacity is minimized and optimized noise and energy resolution performance is obtained.

As an advantageous adjunct to the invention, an additional light-emitting diode 43 may be provided to direct adjustable intensity light 44 upon the radiation detector diode 11 to facilitate adjustment of the leakage current thereof. A variable voltage source 46 is coupled to the diode 43, as by means of a resistor 47, and the diode is in turn connected to ground, such that adjustment of the light intensity is achieved by adjustment of the variable voltage source. Since the leakage current through the detector diode 11 establishes the DC operating point of the preamplifier, control of the leakage current by variation of the intensity of the light 44 enables the DC operating point to be adjusted as desired to establish the most reasonable linear current conditions in the feedback light-emitting diode 28. The foregoing control over leakage current is also advantageous in the performance of tests on the preamplifier.

We claim:

1. A preamplifier comprising an operational amplifier including a low-noise input-amplifying element with an input circuit for receiving input signals, an output, and feedback means coupling said output to said input circuit of said input-amplifying element, said input-amplifying element being a field-effect transistor (FET) including gate, source, and drain terminals, said gate terminal coupled to said input circuit, said source terminal coupled to ground, said drain terminal coupled to said output, said feedback means including a light-emissive element coupled to said output for generating light having an intensity proportional to output voltage thereat and directing said light upon the drain-gate junction diode of said FET, said drain-gate junction diode controlling current flow in said input circuit in proportion to the intensity of light thereby received to provide purely resistive DC feedback between said output and the input circuit of said input-amplifying element.

2. A preamplifier according to claim 1, further defined by said feedback means including an integrating capacitor coupled between said output and said gate terminal of said FET.

3. A preamplifier according to claim 2, further defined by said capacitor comprising the drain-gate capacity of said FET.

4. A preamplifier according to claim 3, further defined by said light-emissive element being a light-emitting diode for generating light in linear proportion to the current flow therethrough, and a current generator coupling said light-emitting diode to said output for driving current through said light-emitting diode in linear proportion to voltage at said output.

5. A preamplifier according to claim 4, further defined by a common-base transistor and an emitter-follower transistor, said drain terminal of said FET connected to the emitter of said common-base transistor, said collector of said common-base transistor coupled to the base of said emitter-follower transistor, the emitter of said emitter-follower transistor coupled to said output, and a pair of feedback resistors serially connected between a bias terminal and the emitter of said emitter-follower transistor with the common junction of said feedback resistors connected to the base of said common-base transistor to thereby feed a fraction of voltage at said output back via said feedback resistors, common-base transistor, and drain-gate capacity of said FET to the gate terminal thereof.

6. A preamplifier according to claim 5, further defined by a reverse-biased radiation detector diode coupled to said gate terminal of said FET, and a second light-emitting diode for directing light of adjustable intensity upon said radiation detector diode to adjust the leakage current flow thereof.